United States Patent [19]

Smith et al.

[11] 4,442,868

[45] Apr. 17, 1984

[54] FOOD CASING WHICH WILL TRANSFER A SMOKE COLOR AND FLAVOR TO FOOD ENCASED THEREIN AND BASIC NATURAL LIQUID SMOKE FOR USE THEREWITH

[75] Inventors: Burl L. Smith, Danville, Ill.; Ronald S. Kearby, State Line, Ind.

[73] Assignee: Teepak, Inc., Chicago, Ill.

[21] Appl. No.: 423,410

[22] Filed: Sep. 24, 1982

[51] Int. Cl.³ ............................................. A22C 13/00
[52] U.S. Cl. ................................. 138/118.1; 138/145; 426/129; 426/135; 426/650; 426/652; 428/36; 427/230
[58] Field of Search ............... 426/650, 652, 129, 135; 427/230; 138/118.1; 428/36

[56] References Cited

U.S. PATENT DOCUMENTS

| | | | |
|---|---|---|---|
| 3,106,473 | 10/1963 | Hollenbeck | 426/650 |
| 3,873,741 | 3/1975 | Melcer et al. | 426/474 |
| 4,104,408 | 8/1978 | Chiu | 426/650 |
| 4,171,381 | 10/1979 | Chiu | 138/118.1 |
| 4,196,220 | 4/1980 | Chiu et al. | 426/650 |
| 4,219,574 | 8/1980 | Chiu | 426/135 |
| 4,278,694 | 7/1981 | Chiu | 426/650 |

*Primary Examiner*—William R. Dixon, Jr.
*Attorney, Agent, or Firm*—Michael L. Dunn; William J. Crossetta, Jr.

[57] ABSTRACT

The invention relates to the formation of basic smoke flavorant and colorant from natural liquid smoke and food casings and food products utilizing the basic smoke. In accordance with the invention, the known acidic liquid smokes which are formed by contacting burning wood smoke with water are neutralized with an alkaline material to form a precipitate and the addition of alkaline material is continued until at least a portion of the precipitate returns to solution. The alkaline smoke solutions are suitable for impregnating regenerated cellulose sausage casings such that during cooking the meat is colored. The invention solutions form a casing that is storage stable after impregnation.

33 Claims, No Drawings

FOOD CASING WHICH WILL TRANSFER A SMOKE COLOR AND FLAVOR TO FOOD ENCASED THEREIN AND BASIC NATURAL LIQUID SMOKE FOR USE THEREWITH

TECHNICAL FIELD

The present invention relates, generally, to bags or casings for colored food stuffs. It particularly relates to impregnated regenerated cellulose casings, for forming wieners, hams, sausages, bologna and other similar meat products. The casings have been impregnated either before or after being filled with uncooked meat products with a colorant and flavorant containing natural liquid smoke that has been treated to render it highly basic.

BACKGROUND ART

It has been known in the art related to treatment of sausage products to artificially impart smoke flavor to frankfurters and other sausage products. While several methods have been proposed in the past for imparting smoke color to frankfurters, it is believed that, in addition to the use of the natural smoke of burning wood, there presently are two methods in commercial use. In both of these, natural-liquid smoke is utilized rather than dye. The liquid smokes are derived from recovery of smoke from burning wood by scrubbing of the smoke with water. In one of these, the stuffed frankfurters are exposed to an atmosphere saturated with vapor phase smoke or in the second alternative the frankfurters are sprayed with a liquid smoke or dipped in a bath containing liquid smoke. While these processes are successful, there are certain economic disadvantages. There is a need for a reduced cooking cycle time, reduced labor cost and increased consistency of color development. Further, there are some meat batters difficult to color with vapor phase or liquid smoke.

Further, it has been known to color frankfurters by use of a transfer casing which has been impregnated with Red 40 or Yellow 6. However, such frankfurters only have limited appeal in that the red frankfurters are only widely sold in the Southeastern U.S. and the Yellow 6 colored (orange) frankfurters are only widely sold in some areas of the Southwestern U.S. Attempts have been made to color frankfurters with combinations of legal Food and Drug Administration approved colors (FD&C colors). However, these colors have been found to differentially diffuse into frankfurters with a result in changes in color within a few days of refrigerator storage and the frankfurter usually takes the surface color of the slowest diffusing component within a few days.

U.S. Patents to Chiu U.S. Pat. Nos. 4,104,408, 4,171,381, 4,196,220, 4,219,574 and 4,278,694 are directed to various means of coating food product casings with colorant and/or flavoring material. They are primarily directed to interior coating rather than exterior. Interior coating, in the gel state of the casing, is difficult particularly for small diameter casings as there is no way to efficiently patch the small casings where the coating slugs are inserted and removed and it significantly increases labor costs. Further, interior coating methods during shirring have difficulty in that when the casing is shirred, the colorant tends to pool in the open loops of the pleats. The liquid smoke derived colorants of U.S. Pat. Nos. 4,196,220 and 4,278,694 are not believed suitable for exterior coating with penetration of the coating to the meat product therein.

It has been disclosed in co-pending and commonly assigned application titled "Food Casing Which Will Transfer a Smoke Color to Food Encased Therein and Extracted Natural Liquid Smoke Colorant for Use Therewith" (Ser. No. 379,795, Inventor M. Goldberg) that colorants for food casings may be formed by neutralization of liquid smoke and separation of the precipitates which separate during neutralization. It is also disclosed therein that the aqueous supernatant liquid which is separated after precipitation may be further purified by solvent extraction. The colorants of Goldberg, while very satisfactory as colorants, are primarily colorants having incompletely retained the smoke flavor due to removal of precipitates.

There remains a need for an improved system for applying smoke color and flavor to encased meat products such as sausages, bologna, salami, hams and frankfurters. There is a need for a smoke color and flavor that will transfer from casing to meat batter during ordinary cooking time and temperatures and remain on the surface of the meat batter after the casing is removed. There is a need for a smoke color which will not bleed excessively or change color when the sausage is reheated. There is a continuing need for a smoke colorant which may be applied to unstuffed casings, from the outside, at normal production line speeds, without any more labor than attended to a casing dyed with a food color such as Yellow 6 and/or Red 40. There also is a need for a smoke color which will be evenly distributed on the meat product surface; whereas, those coated by vapor phase smoke may show marks from where the meat rested on the support stick or was in contact with other frankfurters. Further, there is a need for a colorant which may be applied to the outside or inside of a casing which is stable during the shirring process. There is a further need for an improved colorant which will not interfere with any food casing processing subsequent to its application to the casing such as drying, reeling, shirring, stuffing, linking or peeling and which further will contain a colorant which will have sufficient shelf life for commercial distribution.

DISCLOSURE OF THE INVENTION

It is an object of this invention to overcome smoke colorant and flavorant difficulties of the prior art.

It is an additional object of this invention to create a smoke flavorant and colorant that can be applied to the exterior of food casings to flavor and color meat cooked therein.

It is an additional object of this invention to provide uniform smoke colored meat products.

It is an additional object of this invention to create a storage stable smoke flavorant and colorant impregnated food product casing.

It is a further object of this invention to create a smoke flavorant and colorant that does not deteriorate artificial casing during storage.

It is another object of this invention to create a smoke flavorant and colorant that is suitable for slug coating to create a storage stable casing.

It is another further object of this invention to provide a colorant and flavorant that may be rapidly applied to food products.

These and other objects of the invention have generally been accomplished in accordance with the invention by the alkalization of smoke flavorant and colorant from natural liquid smoke. In accordance with the invention, the known acidic liquid smokes which are formed by contacting burning wood smoke with water are neutralized and then alkalized to at least partially redissolve materials precipitated during neutralizing. The liquid after alkalization and dissolving of precipitate materials forms a storage stable basic liquid smoke flavorant and colorant which is capable of passing from impregnated regenerated cellulose sausage casings during cooking to color and flavor meat being cooked in the impregnated casing. The colorant and flavorant of the invention are also suitable for slug coating or dip coating. Further, the colorants and flavorants of the invention do not cause excessive deterioration of the casing during storage after impregnation.

In a preferred form of the invention, a conventional acidic liquid smoke is treated by addition of NaOH until the pH reaches about 10 to about 12.5. At this pH, the precipitates that appear during neutralization are substantially completely redissolved.

MODES FOR CARRYING OUT THE INVENTION

The invention has numerous advantages over prior processes. The invention provides a system for providing a smoke flavoring and coloring to sausages, particularly skinless frankfurters, in a way which has heretofore not been possible. The invention allows for uniform application of color and flavor to the sausage. Further, the shelf life of the colored and flavored frankfurters is long and the shelf life of the colored and flavored casing prior to filling with meat product also is sufficient to allow commercial distribution. The smoke flavor and color of the invention is suitable for application to unstuffed casings prior to drying at normal production line speeds without any more labor than required in known methods of dying with FD&C approved colorants such as Red 40 and Yellow 6. The colorant and flavorant of the invention does not leave shadows caused by smoke sticks or contact with other frankfurters during cooking. In one embodiment there is no need in the invention for the slow production speeds and difficult patching of the casing involved in slug coating of the interior surface of small diameter casings. Additionally, the colorant and flavorant is also suitable for slug impregnation of large diameter casings and fibrous reinforced casings. The colorants and flavorants of the invention remarkably color and flavor the sausage product in a uniform and pleasing manner when the colorant and flavorant is applied to the outer surface of the casing by dip or spray in the gel state of the casing prior to drying and storage or applied to the outer surface of the cased sausage after it is stuffed with uncooked meat but is treated to impregnate with the colorant and flavorant prior to cooking. Another advantage of the invention is that color and flavor of the sausage is more controlled as the colorant and flavorant are applied by the casing manufacturer rather than subject to the ability of the person operating the cooker or smoker at the sausage-making location. Another advantage of the instant invention is that the natural smokes being very acidic are highly corrosive to equipment; whereas, the basic smokes of the instant invention are less corrosive. There is very little equipment exposure as color and flavor is in the casing rather than being applied by atomization. Further, any fumes and odor connected with imparting a smoke flavor and color to the sausage is lessened by use of the colorant and flavorant of the invention. Another advantage is that the sausage packer may form smoke colored and flavored sausages in less time as the color transfer takes place during the normal cooking time and no further treatment is necessary.

Another surprising advantage of the basic colorant and flavorant of the invention is that the sausage casing may be impregnated with a great amount of water and still be stored without mold or bacteria damaging the casing. The present practice is to use less water and to add a plasticizer so that the casing is suitable for stuffing. With the invention, little or no plasticizer, such as propylene glycol, is necessary for the casing to be stuffed as more water is present to plasticize the casing. A further advantage is that the basic smoke colorant and flavorant of the invention aids in stripping or peeling of the casing from the meat after it is cooked. A further advantage of the invention is that the basic smoke of the invention is less volatile than present liquid smokes and therefore the smoke color and flavor is maintained during drying to a much greater degree than the present commercial liquid smokes which are largely lost during a drying step. These and other advantages of the invention will be clear from the full description given below.

While it has been known that the smoke colorants and flavorants derived from the burning of wood materials as above described need to be maintained at acid pH and are difficult to maintain at neutral pH without the addition of other materials such as alcohols, it has surprisingly been discovered that natural liquid smokes may be treated with alkaline material and then easily maintained in solution at high pH without further additives to the solution. This is especially important in this case as the use of alcohol or other additives to stabilize the colorant and flavorant is another food additive. As is well known, there is a desire to minimize the addition of food additives during processing and, therefore, colorants and flavorants without additives are desirable. The invention provides a flavorant and colorant of natural smoke ingredients which is of high pH which makes possible the formation of storage stable regenerated cellulose color and flavor impregnated casings.

It has surprisingly been found in the instant invention that the materials of conventional natural smoke colorings and flavorings which precipitate during neutralization are returned to solution when a highly basic solution is reached. More complete dissolving takes place at high pH, but the precipitate does not need to be completely dissolved to create a useful flavorant and colorant. The colorant and flavorant of the invention may be applied to sausage casing with much less deterioration of the casing than is caused by the conventional highly acidic liquid smoke. Further, the basic liquid smoke of the invention gives a desirable smoke color and flavor as the acidic liquid smoke but does not lead to rapid deterioration of sausage casing during storage. The conventional acidic liquid smokes are believed to quickly deteriorate casings during storage.

Smoke coloring and flavoring constituents suitable for use in preparing the colorant and flavorant of the present invention are generally those designated as being the coloring and flavoring constituents of "liquid smoke" which is a well known class of materials also commonly referred to as "liquid smoke solutions." Various "liquid smokes" are known, all of which are believed suitable for use in the present invention.

Liquid smoke often is a solution of natural wood smoke constituents prepared by burning a wood, for example, a hickory or a maple, and capturing the natural smoke constituents in a liquid medium such as water. Alternatively, the liquid smoke to be used may be derived from the destructive distillation of a wood, that is, the breakdown or cracking of the wood into various compounds which are distilled out of the wood residue. Liquid smokes are generally very acidic, usually having a pH of 2.5 or less and titratable acidity of at least 3%, although some partially neutralized liquid smokes, having a pH up to about 5, are also available. Reference to the phrase "natural liquid smoke" or "conventional or commercial liquid smoke", as used throughout this specification and in the appended claims with respect to materials for forming the basic liquid smoke compositions and casings of the invention, is intended to refer to, and should be understood as referring to, the smoke coloring and flavoring constituents and proportions thereof of liquid smoke solutions in their present commercially available form. The commercially available liquid smokes may include modifiers to change the taste or other properties of the natural liquid smokes.

The liquid smoke that is preferred for use with this invention is a solution of natural wood smoke constituents. This liquid smoke is produced by the limited burning of hardwoods and the absorption of the smoke so generated into an aqueous solution under controlled conditions. The limited burning keeps some of the undesirable hydrocarbon compounds or tars in an insoluble form, thereby allowing removal of these constituents from the final liquid smoke. Thus, by this procedure, the desirable wood constituents are absorbed into the solution in a balanced proportion and the undesirable constituents may be removed. The resultant liquid smoke solution is representative of the whole preferred spectrum of smoke colors and flavors without a preference of any one type. The apparatus and method for manufacturing typical liquid smokes of the preferred type is more fully described in U.S. Pat. No. 3,106,473 to Hollenbeck and U.S. Pat. No. 3,873,741 to Melcer et al.

Certain liquid smokes have been approved for use in foods by the U.S. Food and Drug Administration and the Meat Inspection Division of the U.S. Department of Agriculture. Exemplary of suitable commercially available liquid smokes are CHARSOL from Red Arrow Products Co., Manitowoc, Wisconsin; LIQUID HICKORY SMOKE from Hickory Specialties, Inc.; GRIFFITH'S NATURAL SMOKE FLAVOR from Griffith Laboratories Inc.; and SMOKAROMA LIQUID SMOKE CODE 10 from Meat Industry Suppliers, Inc.

Any water-soluble alkalizing agent may be used in accordance with the invention. Typical of water-soluble alkaline materials are ammonium hydroxide, potassium hydroxide, sodium carbonate, sodium bicarbonate and combinations thereof. Sodium carbonate and sodium bicarbonate may also act as buffers. A preferred material for utilization in the invention has been found to be sodium hydroxide at high concentrations as this provides good alkalization without increasing the aqueous bulk of the basic liquid smoke of the invention significantly.

The amount of basic colorant and flavorant of the invention applied to the casing may be any suitable amount. Generally, only enough is applied to gain the particular smoke color wanted in the product to be prepared in the casing. Test results have indicated that a weight gain of 36% to about 100% are typically measured in testing of the invention with dried fibrous casing. However, it is contemplated that in commercial use the percent by weight of pickup of the basic liquid smoke of the invention could be higher or lower. Weight pickup with gel state casings is not easily measured as colorant and flavorant replace water in the casing, but is expected to be less than for impregnating dried casings.

The temperature of the natural liquid smoke during the addition of the alkaline material may be controlled to give any desired smoke product. However, it is considered advisable to maintain the temperature of the liquid smoke below about 50° C. in order to maintain the solubility of the solution and stability of the solution during storage at ambient temperature.

The pH of the basic liquid smoke of the invention may be any amount which will maintain the solubility of the solution and stability of the solution during storage at ambient temperature. Typical of pHs suitable for the invention are those between about 9 and about 13. A preferred pH is between about 10 and about 12.5 for ease of application to the artificial casings without substantial deterioration of casing or the colorant and flavorant during storage.

The colorant and flavorant of the invention may be applied to casing material by any suitable impregnation technique. Typical of such coating and impregnation techniques are slug coating, spraying and dipping. A suitable method of impregnation is dipping when the regenerated cellulose casing is in the gel state as only one drying step then needs to be performed. The gel state is the state of the casing immediately prior to being dried and sized. The casing after dip coating, drying and sizing is capable of applying a pleasing smoke color and flavor to a sausage product which is stuffed and cooked therein. The colorant and flavorant after being externally coated is impregnated in the casing and passes through the regenerated casing during cooking and is deposited on to the meat product. It is also within the invention to utilize the colorant and flavorant of the invention for dip coating of a casing after it has been filled with a processed meat product but prior to cooking. In a preferred form of the invention, the basic liquid smoke of the invention is slug coated onto the interior of the gel state casings of large diameter. The gel state casings may be fibrous reinforced. The slug coating of large casing is preferred because there is a need for a casing which may be colored and flavored and then is storage stable for shipping to where sausages are packed. The slug coating of dried fibrous reinforced casings is preferred as the dried casing at about 3 percent water picks up more colorant and flavorant and because the colorant and flavorant may decompose somewhat during drying. Further, while described with particular reference to the use with strippable casings it is also within the invention to utilize the invention colorant and flavorant for edible casing products.

Any known food casing material may be used with the colorant and flavorant of the invention. The food casing may be either coated or impregnated by the basic smoke of the invention. Typical of coatable food casing materials are nylon, polyester, polyvinylidene chloride polymers and copolymers (saran), polyacetate and combinations thereof. Typical of impregnatable or swellable casings materials are amylose, polyvinyl alcohol, regenerated cellulose, natural casings and collagen. The casings further typically may have inner or outer barrier coats and reinforcing materials. Casings believed particularly suitable for the invention are natural casings, collagen, regenerated cellulose and regenerated cellulose reinforced with fibrous cellulose paper or other reinforcing material with or without barrier coating. A preferred food casing is strippable regenerated cellulose as it is widely used, easily impregnates by dipping and transfers the invention colorant and flavorant well to give pleasing smoke color and flavor to the meat material during cooking. In another preferred form, the colorant and flavorant of the invention are applied by slug coating the interior of dried fibrous reinforced regenerated cellulose casings. Some of the casing materials may be less permeable and must have the colorant and flavorant of the invention applied to the interior of the casing; likewise, the colorant and flavorant may be applied to both the interior and the exterior of the casing when needed.

The food product colorant and flavorant of the invention may be utilized with additives to increase the ease of peeling of the casing from the meat product after cooking. Such additives may be either in the casing itself prior to treatment with the colorant and flavorant of the invention or may be combined with the colorant and flavorant of the invention prior to dipping to impregnate the casing. Release agents are utilized to aid in the rapid peeling of the casing after cooking without damage to the surface appearance of the meat product. Materials to aid in release or peelability of the casing are known in the sausage making art, and are primarily utilized for high speed stripping such as for hot dogs and for certain difficult to strip meat products such as some hams and salamis. Release agents are disclosed in patent literature, such as U.S. Pat. No. 3,898,348 to Chiu et al and U.S. Pat. No. 3,451,827 to Bridgeford.

It is preferred that the release material, if needed, be added to the colorant and flavorant liquid of the invention for simultaneous application of colorant, flavorant and release characteristics to the casing. Any suitable release additive may be utilized with the liquid colorant and flavorant. Typical of such materials are the alginates, dextrins, amylopectins, acrylic acid salts, methacrylic acid salts, polyethylene oxides, polydextrose, polyvinyl alcohol, gum arabic, and rabinogalactan. Suitable for the addition to the liquid colorant and flavorant of the invention are water-soluble ethers. Typical water-soluble cellulose ethers which may be employed are the non-ionic water-soluble alkyl and hydroxylalkyl cellulose ethers such as, for example, methylcellulose, hydroxypropyl methylcellulose, hydroxypropylcelulose, ethyl methylcellulose, hydroxyethylcellulose and ethyl hydroxyethylcellulose. Suitable are the anionic water-soluble cellulose ethers such as, for example, carboxymethyl hydroxyethylcellulose. Preferred is carboxymethylcellulose as it provides superior peeling of the casing and is dispersible in the alkali colorant and flavorant of the invention. Commercially, carboxymethylcellulose and carboxymethyl hydroxyethylcellulose are almost always sold as the sodium salt, and it is well established trade practice not to refer to the commercial product as the sodium salt. For the purpose of this application, reference to these materials shall mean the sodium salt and other alkali metal salts and alkali earth salts thereof. Also suitable are the alkali soluble cellulose ethers, as, for example, alkali soluble methyl cellulose and hydroxyethyl cellulose, and for the purpose of this application the definition of water soluble is intended to include such alkali soluble cellulose ethers.

It is also possible to place a release agent in the casing either prior to applying the colorant and flavorant of the invention or after application of the colorant and flavorant of the invention to the casing. Typical of such materials utilized to apply a coating or impregnate to the casing which will allow release from the cooked meats are silicon emulsions, natural waxes and synthetic oils mixed with synthetic fatty materials. Suitable for the invention are the chromium fatty acid complexes. The preferred materials for the coating of casings later to be dipped in the colorant and flavorant of the invention are alkyl ketone dimers particularly those formed predominantly from long-chain alkyls having between 16 and 18 carbon atoms as these materials provide good release of the casing from the meat while being readily soluble and/or dispersible in the liquid colorant and flavorant of the invention.

The release material added to the colorant and flavorant solution of the invention may be added in any amount which achieves the desired release with the particular meat product being cooked in the casing. Generally, an amount between about 0.5 percent and about 2 percent of carboxymethylecellulose by weight in the solution is satisfactory for good release characteristics. The preferred amount is between about 1 percent and about 1.5 percent carboxymethylcellulose by weight in the colorant and flavorant solution of the invention for good release properties and pleasing smoke flavor and color.

Other ingredients which are normally used in the manufacturing and/or further treatment of food product casings may also be combined with the basic colorant and flavorant of the invention. Preferred additives for utilization with the colorant and flavorant system of the invention are glycerin, propylene glycol and mixtures thereof which act as plasticizers for the casing and may typically be added in amounts up to about 10 percent by weight of the aqueous flavorant and colorant.

The amount of the smoke flavorant and colorant of the invention which is to be applied to a food casing depends on the desired color and flavor characteristics to be imparted to the food product processed therein. The amount may vary widely depending on the cure state of the casing, the size of the casing, thickness of the casing, type of food product to be flavored and colored and concentration of the colorant and flavorant material when applied to the casing.

The food casings impregnated or coated with the basic liquid smoke of the invention may be provided in any of the forms known. Typical of such forms are discreet short segments of flattened casings, shirred strands and continuous lengths of flattened casings on a reel. Preferred forms are shirred strands and reels of slug coated fibrous casings as the colorant and flavorant of the invention provide particular advantage in that the basic liquid smoke is storage stable allowing the distribution and storage of impregnated reels and shirred strands which will be filled with meat products by conventional machinery.

The following examples are intended to be illustrative of the invention but not exhaust all possibilities. Parts and percentages are by weight unless otherwise indicated. Temperatures are in Fahrenheit unless otherwise indicated.

EXAMPLE I

About 100 milliliters of natural hickory liquid smoke (CHARSOL H10 from Red Arrow Products Co., Manitowoc, Wisc.) was neutralized to a pH of about 7 with a solution of about 50 percent sodium hydroxide at which point a precipitate formed. Addition of the solution of about 50% sodium hydroxide was continued with agitation of the solution. The temperature of the solution further was monitored to maintain the temperature below about 48° centigrade. The addition of sodium hydroxide was continued until precipitate had substantially disappeared forming a basic smoke. The reading with a pH meter at this point indicated that the pH was about 11. This solution was suitable for use as the basic liquid smoke flavor and colorant of the invention. Three foot lengths of regenerated cellulose casings for frankfurters were dipped in the basic liquid smoke and hand stuffed. The frankfurters were cooked in a commercial type smokehouse for 1½ hours at the normal frankfurter cooking conditions. The casings were stripped from the frankfurters, and it could be seen that a pleasing smoke color had been transferred to the frankfurters and smoke taste was present.

EXAMPLE II

Example I was repeated except that a larger volume of solution was formed and the solution was utilized to slug coat about a 1,000 ft. reel of dried casing of Code 9 (4.4 inches diameter) fibrous reinforced regenerated cellulose casing. The casing had an average pickup of about 49% by weight of original casing weight. The coating was carried out at about 300 ft./min. A three foot section of the casing was then filled with a bologna meat and cooked in a conventional manner at about 152° F. for about 8 hours. A pleasing smoke color and taste was found to have transferred to the bologna.

EXAMPLE III

The process of Example II was repeated except that prior to stuffing the casing was placed in a polyethylene bag for about 30 days. This also was found to produce suitable stuffing characteristics and additionally a pleasing smoke colored and flavored product.

EXAMPLE IV

The procedure of Example II is repeated except the fibrous regenerated casing in the gel state, prior to drying, is slug coated. The bologna after cooking has a pleasing flavor and color.

EXAMPLE V

A six foot length of regenerated cellulose frankfurter casing in the gel state is dipped in a colorant and flavorant formed as in Example I and then air dried. An about two feet length was stuffed and cooked. The frankfurter is found to have a pleasing smoke taste and color.

EXAMPLE VI

An about six foot length of dried fibrous reinforced casing (Code 1) of about 53 mm. diameter is slug coated. The colorant and flavorant process of claim 1 is used to form the colorant and flavorant except that the pH is taken to about 12.5. After slug coating, the casing is air dried overnight, stuffed with a bologna type meat and cooked 4 to 5 hours until the internal temperature was 152° F. The meat is found to have a pleasing smoke color and flavor.

EXAMPLE VII

The process of Example II is repeated except the speed of slug coating is 210 ft./min. A further difference is that the basic smoke formed as in Example I is made to a pH of about 10. The weight gain of the casing is about 46%. The meat after cooking to 152° F. internal temperature is found to have a strong smoke color and taste.

EXAMPLE VIII

The process of Example II is repeated except about 2% by weight propylene glycol is added to the basic liquid smoke prior to slug coating. Further, the speed of slug coating is 210 ft./min., and the basic liquid smoke formed by the process of Example I is brought to an alkaline reading of about pH 12. The casing has about 64% weight gain during slug coating. The bologna is found to have a pleasing smoke color and taste.

EXAMPLE IX

The process of Example II was repeated except that about one percent sodium carboxymethylcellulose by weight was added to the basic liquid smoke of the invention prior to dipping of the casing into the colorant and flavorant. The stripping properties of the casing from the meat were found to be very good. The sodium carboxymethylcellulose was the powder form of sodium carboxymethylcellulose identified as 7L available from Hercules Incorporated, Wilmington, Del. It was dissolved in propylene gycol to form a 20% by weight solution of the carboxymethylcellulose. This 20% solution was added in such an amount to the liquid smoke solution of the invention as to give about one percent by weight of carboxymethylcellulose in the basic smoke solution used to impregnate the casing.

EXAMPLE X

The process of Example IX was repeated except that the carboxymethylcellulose was added in an amount of about 1.5% by weight to the dip solution of the colorant and flavorant of the invention. The strip properties of the casing after the meat was cooked therein was very good. Further, the colorant and flavorant were also pleasing.

EXAMPLE XI

The process of Example II was repeated except that the casing prior to coating with the liquid colorant and flavorant of the invention was coated with a release material. The release material was identified as Aquapel 360 XC (Trademark) from Hercules Incorporated, Wilmington, Del. This material is an alkyl ketone diamer and is a dispersion of Hercules Aquapel 364 (Trademark), predominantly stearyl diamer ($C_{18}$), emulsified in water so that 12% by total weight of the solids in the latex is a catatonic starch. The release material was slug coated onto to the casing from a solution of about 0.8 to about one percent solids so as to give a casing coating of between about 40 and about 50 milligrams per square inch of surface of the casing. After coating, the casing was dried at about 185° F. to 190° F. to bind the release material to the casing surface prior to dipping into the alkyline colorant and flavorant of the invention. This material also was found to provide a pleasing smoke color and good release properties of the cooked sausage from the casing.

The basic liquid smoke of the invention while herein described as utilized with food casing materials for food products also could, as would be obvious to one skilled in the art, be used in other food colorant and flavorant processes. They could be mixed into food such as stews or gravies to provide flavor and color. They further could be applied directly to food by dipping or injected into foods such as hams, fish or fowl where a smoke color and a smoke flavor is desired.

In the foregoing specification, a complete description of the invention has been set forth. However, it will be apparent to those skilled in the art that modifications and variations may be made therefrom without departing from the spirit and scope of this invention which is limited only by the claims attached hereto. It would be within the invention to combine the basic liquid smoke of the invention with other Food and Drug Administration approved colorants such as Yellow 6 to achieve different color variations or to color and flavor foods other than meat such as cheese. Further, the liquid smoke could be combined with other materials such as preservatives and fragrances to change the storage and odor properties of the casing. While described most specifically with regard to regenerated cellulose casings, it also would be within the invention to color and flavor meat products in polymer casings or in edible collagen casings or natural casings. Further, the coloring and flavoring of the invention would find use in coloring of casings themselves in those instances in which sausages are sold in casings removed after sale but prior to eating. These and other variations of the invention are intended to be included by the claims attached hereto.

What is claimed is:

1. A casing for meat products comprising a tube, impregnated with a colorant and flavorant comprising a basic liquid smoke coloring and flavoring solution alkalized to a pH above about 10.

2. The casing of claim 1 wherein said tube comprises regenerated cellulose.

3. The casing of claim 1 wherein said tube comprises fibrous reinforced regenerated cellulose.

4. The casing of claim 1 wherein the colorant and flavorant are storage stable.

5. The casing of claim 1 wherein said colorant and flavorant further comprises at least one element selected from the group consisting of glycerin, propylene glycol and combinations thereof.

6. The casing of claim 1 wherein said colorant and flavorant are impregnated on the exterior of said tube.

7. The casing of claim 1 wherein said colorant and flavorant are derived from commercially available natural liquid smokes.

8. The casing of claim 1 wherein said coloring and flavoring further comprises an FDA approved color.

9. The casing of claim 1 wherein said colorant and flavorant are impregnated on the interior of said tube.

10. The casing of claim 1 wherein said tube comprises regenerated cellulose coated on the inside with a barrier layer.

11. The casing of claim 1 wherein said tube comprises regenerated cellulose coated on the outside with a barrier layer.

12. The casing of claim 1 wherein said tube is formed from a material comprised of at least one member selected from the group consisting of nylons, polyesters, polyvinylidene chloride polymers, polyvinylidene copolymers, polyacetate and combinations thereof.

13. The casing of claim 1 wherein said casing further comprises release material.

14. The casing of claim 13 wherein said release material is a carboxymethylcellulose.

15. The casing of claim 13 wherein said release material comprises a chromium fatty acid complex.

16. The casing of claim 13 wherein said release material comprises a coating of alkyl ketone dimer.

17. The casing of claim 1 wherein said tube further comprises a water-soluble cellulose ether.

18. The method of forming a storage stable food casing of claim 1 capable of imparting a smoke color and flavor to a meat product cooked therein comprising providing a food casing and impregnating said casing with a natural smoke flavorant and colorant having a pH of from between about 10 and about 12.5.

19. The method of claim 18 wherein said smoke flavorant and colorant is formed from commercially available aqueous natural liquid smoke by neutralizing with an alkaline material until a precipitate forms and continuing the addition of alkaline material until at least a portion of the precipitate returns to solution.

20. The method of claim 18 wherein said flavorant and colorant further comprises a plasticizer selected from the group consisting of propylene glycol, glycerin and mixtures thereof.

21. The method of claim 19 in which the flavorant and colorant have been applied to the outside of the casing by dipping.

22. The method of claim 19 wherein said casing is shirred after impregnation with said flavorant and colorant.

23. The method of claim 19 wherein said casing further comprises fibrous material to reinforce said casing.

24. The method of claim 19 wherein the said flavorant and colorant are applied by slug coating to said casing.

25. The method of claim 19 wherein said basic smoke flavorant and colorant is applied during shirring.

26. The method of claim 19 wherein said casing comprises regenerated cellulose.

27. The method of claim 18 wherein said food casing comprises regenerated cellulose coated on the inside with a barrier layer.

28. The method of claim 18 wherein said food casing comprises regenerated cellulose coated on the outside with a barrier layer.

29. The method of claim 18 wherein said food casing is formed from a material comprised of at least one member selected from the group consisting of nylons, polyesters, polyvinylidene chloride polymers, polyvinylidene copolymers, polyacetate and combinations thereof.

30. The method of claim 18 wherein said basic natural smoke flavorant and colorant used in said impregnating further comprises a release material.

31. The method of claim 18 wherein said basic natural smoke flavorant and colorant further comprises a water-soluble cellulose ether release material.

32. The method of claim 18 wherein said food casing is coated with a release material prior to said impregnating.

33. The method of claim 30 wherein said food casing is coated with a release material selected from the group comprising alkyl ketone dimers and chromium fatty acid complexes.

* * * * *

UNITED STATES PATENT AND TRADEMARK OFFICE
CERTIFICATE OF CORRECTION

PATENT NO. : 4,442,868
DATED : April 17, 1984
INVENTOR(S) : Burl Lester Smith and Ronald Sherwood Kearby It is certified that error appears in the above—identified patent and that said Letters Patent is hereby corrected as shown below:

Column 12, Line 14, delete "from between" insert in its place

---above---;

Line 14, delete "and about 12.5".

Signed and Sealed this

Fourteenth Day of August 1984

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,442,868
DATED : April 17, 1984
INVENTOR(S) : Burl Lester Smith and Ronald Sherwood Kearby It is certified that error appears in the above-identified patent and that said Letters Patent is hereby corrected as shown below:

Column 1, line 6 insert,

CROSS REFERENCE TO RELATED APPLICATION

This is a continuation-in-part of Serial No. 396,512, filed July 8, 1982, now U.S. Patent 4,446,167.

Signed and Sealed this

Twenty-seventh Day of November, 1990

Attest:

HARRY F. MANBECK, JR.

*Attesting Officer*   *Commissioner of Patents and Trademarks*